UNITED STATES PATENT OFFICE.

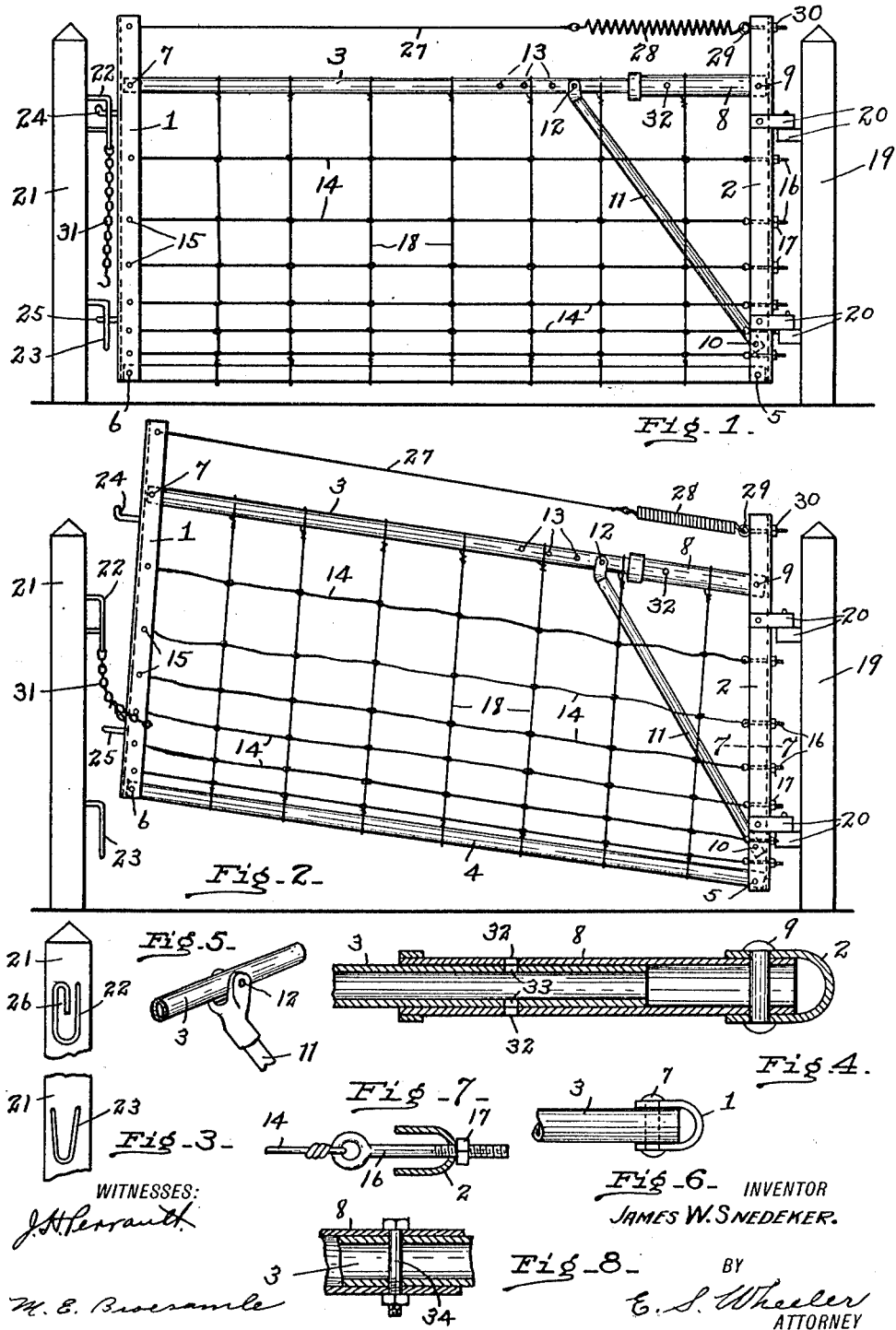

JAMES W. SNEDEKER, OF ADRIAN, MICHIGAN.

FARM-GATE.

1,073,536.  Specification of Letters Patent.  Patented Sept. 16, 1913.

Application filed October 28, 1912. Serial No. 728,026.

*To all whom it may concern:*

Be it known that I, JAMES W. SNEDEKER, a citizen of the United States, residing at Adrian, in the county of Lenawee, State of Michigan, have invented certain new and useful Improvements in Farm-Gates; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to farm gates and consists in the construction and arrangement of parts hereinafter more fully set forth and claimed.

The object of the invention is to provide a gate of comparatively simple and inexpensive construction wherein provision is made for automatically lifting the front of the gate to permit of the passage of small live stock thereunder and to enable the gate to swing free from snow.

The above object is attained by the structure illustrated in the accompanying drawings, in which:—

Figure 1 is an elevation of a gate embodying my invention, showing said gate in the closed position. Fig. 2 is a similar view showing the front end of the gate lifted. Fig. 3 is a fragmentary view in elevation of a gate post carrying the keepers in which the latch pins on the front vertical bar of the gate engage. Fig. 4 is a fragmentary view in horizontal section through the telescopic portion at the rear end of the upper horizontal bar of the gate frame and through the upper end of the rear vertical bar to which the horizontal bar is pivoted. Fig. 5 is a fragmentary view in perspective showing the pivotal connection between the upper end of the diagonal brace and the upper horizontal bar of the gate frame. Fig. 6 is a fragmentary view in top plan showing the manner of pivotally connecting the ends of the horizontal bars to the vertical bars of the gate frame. Fig. 7 is a fragmentary view in section through the rear vertical bar of the gate frame, as on line 7—7 of Fig. 2, illustrating the manner of connecting the rear ends of the strand wires to said rear vertical bar. Fig. 8 is a fragmentary view in longitudinal section showing the means for rendering rigid the telescopic sections of the upper bar of the gate frame.

Referring to the drawings by the characters of reference marked thereon, 1 and 2 designate the front and rear vertical bars respectively, and 3 and 4 designate the upper and lower horizontal bars respectively of the gate frame. The rear end of the lower horizontal bar 4 is pivoted at 5 to the lower end of the rear vertical bar 2. The front end of the lower horizontal bar is pivoted at 6 to the lower end of the front vertical bar 1, and the forward end of the upper horizontal bar 3 is pivoted at 7 to the upper end of the front vertical bar 1. The vertical bars 1 and 2 are preferably U-shaped in cross section, and the terminals of the horizontal bars lie between the sides of said U-shaped vertical bars. The rear end of the upper horizontal bar 3 is made telescopic by causing it to enter and slide longitudinally in a short tubular section 8 of a diameter to receive it, the rear end of said short section being pivoted at 9 to the upper end of the rear vertical bar 2. Pivoted at 10 to the rear vertical bar, near its lower end, is a diagonal brace 11 whose upper end is pivoted at 12 to the upper horizontal bar 3, said upper bar being provided with a plurality of apertures 13 for this purpose.

Crossing between the vertical end bars of the gate frame are the longitudinal strands 14. The forward ends of these strands are connected at 15 to the front bar 1. The rear ends of said strands are connected to eye bolts 16, as clearly shown in Fig. 7, said bolts passing through the U-shaped rear vertical bar 2 and receiving on their threaded ends the nuts 17. By turning said nuts any desired tension may be placed upon the longitudinal strands of the gate. Crossing the longitudinal strands and attached thereto are the vertical or stay strands 18, the ends of said stays being secured to the upper and lower horizontal bars, respectively, of the gate frame.

The gate is hung from the post 19 through the medium of the hinge members 20 of common construction. The post 21 is provided with an upper keeper 22 and a lower keeper 23 adapted to receive the upper and lower latch pins 24 and 25, respectively, to retain the gate closed. In order to hold the front end of the gate down, the upper keeper 22 is provided with a loop 26 (see Fig. 3) in which the upper latch pin 24 may engage, thereby preventing the front end of the gate rising until said pin is disengaged from said loop by depressing the front end of the gate to carry said pin from the lower end thereof. The keepers hold the gate at the top and bottom when closed and prevent it becoming sprung.

The upper ends of the end bars are extended above the gate frame, and to the projecting end of the front bar is attached the forward end of a cable 27. At the rear end of said cable is attached one end of a strong contractible spring 28. The rear end of said spring is connected to the projecting end of the rear bar by an eye bolt 29 which passes through said bar and receives a nut 30. By turning said nut a spring tension may be placed upon said spring. This tension when the front end of the gate is released tends to move the gate frame upon its points of pivot 5, 6 and 7 and to cause the rear end of the upper horizontal bar 3 to slide into the tubular section 8, whereby the diagonal brace 11 is made to lift the forward end of the gate, as shown in Fig. 2, the whole front portion of the gate frame swinging upwardly on the pivotal point 5, and the short section 8 swinging upwardly on the pivot 9 to accommodate the movement. By adjusting the upper end of the diagonal brace along the upper horizontal bar the degree of elevation of the front end of the gate may be varied as desired. With the front end of the gate elevated as described, small live stock may pass thereunder without permitting the passage of larger stock, or the gate may be swung on its hinges in either direction to clear a snow-bank or other obstruction.

To fasten the gate when its front end is lifted so as to prevent it swinging upon its hinges, a chain 31 is employed which hangs from the keeper 22, and which may be passed around the front vertical bar of the gate and hooked, as shown in Fig. 2. This allows some freedom of movement of the gate but will not permit it to swing open.

To close the gate its free end is swung into alinement with the post 21 and is drawn downwardly so as to cause the lower latch pin 25 to enter the keeper 23, and the upper latch pin 24 to engage in the loop 26 of the keeper 22, thereby fastening the gate closed and retaining its forward end against the lifting tendency of the contracting tension of the spring 28. The tension of said spring is such that immediately the front end of the gate is released from the keeper it will automatically rise to the position shown in Fig. 2 and will remain in said position until drawn downwardly and the latch pin 24 reengaged in the loop of the keeper 22.

To provide for rendering the frame of the gate rigid in cases where it is not desired to raise the front end thereof, there are formed in the short section 8 transverse openings 32, and in the end of the bar 3 slidable within the section 8 corresponding openings 33, as shown in Fig. 4. These openings are made to register when the gate is in the position shown in Fig. 1, whereby, by passing a bolt 34 transversely through said openings as shown in Fig. 8, the telescopic section of the upper bar may be locked against movement, thereby rendering the gate frame rigid.

It will be noted that as the front end of the gate rises the upper bar 3 is shortened because of the sliding of one section thereof into the other. This causes the front end bar 1 to stand obliquely with respect to the rear end bar 2, whereby the distance between the upper ends of said bars is shortened, causing a consequent slackening of the tension upon the strand wires 14. When the gate is drawn downwardly and locked in the position shown in Fig. 1 the front bar 1 assumes a vertical position and tension upon the strand wires is restored.

Having thus fully set forth my invention, what I claim as new, and desire to secure by Letters Patent, is:—

1. A gate comprising vertical end bars and upper and lower horizontal bars, the lower bar being pivoted at its ends to the lower ends of the end bars respectively, the upper bar being pivoted at one end to an end bar and having a slidable connection at the other end with the other end bar, a diagonal brace pivoted to the rear end bar and to the slidable bar, and tension means extending between and connecting the end bars.

2. A gate comprising vertical end bars and upper and lower horizontal bars, the lower bar being pivoted at its ends to the lower ends of the end bars respectively, the upper bar being pivoted at one end to an end bar and having a slidable connection at the other end with the other end bar, a diagonal brace pivoted to the rear end bar and to the slidable bar, tension means extending between and connecting the end bars, and means for placing stress upon said tension means.

3. A gate comprising vertical end bars and upper and lower horizontal bars, the lower bar being pivoted at its ends to the lower ends of the end bars respectively, the major portion of the upper bar being pivoted at one end to the upper end of an end bar and having a minor section into which said major portion is slidable, said minor section being pivoted to the upper end of the other end bar, a diagonal brace pivoted to the rear end bar and to the slidable portion of the upper bar, and tension means extending between and connecting the end bars.

4. A gate comprising a quadrangular frame whose members are pivoted together at three corners, the upper horizontal member of the frame at the fourth corner having a slidable section and a pivotal engagement with the vertical member, a diagonal brace pivoted to the members of the frame and crossing the corner where the members of the frame are slidably engaged, a tension strand extending between and connecting the end members of the frame, and means for placing longitudinal stress upon said strand.

5. A gate comprising vertical end bars and upper and lower horizontal bars, the lower horizontal bar being pivoted at its ends to the lower ends of the vertical end bars, respectively, the other horizontal bar being pivoted at its forward end to the upper end of the front vertical bar, a support pivoted to the upper end of the rear vertical bar, the rear end of the upper horizontal bar having a slidable engagement with said support, a diagonal brace pivoted to the rear vertical bar and to the upper horizontal bar, and tension means extending between and connecting the end bars.

6. A gate comprising a rectangular frame jointedly connected at its corners, one of said joints being slidable, a pivoted diagonal brace crossing the corner where the parts are slidably connected, the end members of the frame extending above the upper horizontal member of the frame, a longitudinally extending tension strand connecting the upper ends of said end members for lifting the free end of the gate frame, a post, and a keeper on said post for holding the free end of the gate frame against vertical movement.

7. A gate frame comprising vertical end bars and upper and lower horizontal bars, the lower bar being pivoted at its ends to the ends of the end bars respectively, the upper bar extending between and yieldingly connecting the upper ends of the end bars, a diagonal brace extending between the rear end bar and the upper bar and pivotally connected at its ends to said bars respectively, and tension means extending between and connecting the upper ends of the end bars.

In testimony whereof, I sign this specification in the presence of two witnesses.

JAMES W. SNEDEKER.

Witnesses:
GEO. L. BENNETT,
F. E. OSGOOD.

---

Copies of this patent may be obtained for five cents each, by addressing the "Commissioner of Patents, Washington, D. C."